United States Patent [19]
Mantino

[11] 3,836,024
[45] Sept. 17, 1974

[54] LIFTING APPARATUS
[76] Inventor: Michael J. Mantino, 22 S. Bend Ln., Lakeview, N.Y. 14085
[22] Filed: Feb. 15, 1973
[21] Appl. No.: 332,714

[52] U.S. Cl............................. 214/75 H, 212/65
[51] Int. Cl.............................................. B60p 1/54
[58] Field of Search........ 214/75 R, 75 H, 450, 451, 214/86 R, 85.5; 212/64, 65, 66, 46 B; 254/4 R, 4 B, 4 C, 139.1

[56] References Cited
UNITED STATES PATENTS

| | | | |
|---|---|---|---|
| 2,461,401 | 2/1949 | Trombley | 212/65 |
| 2,509,950 | 5/1950 | Zierke | 214/75 H |
| 2,974,809 | 3/1961 | Sellars et al. | 212/34 |
| 2,993,607 | 7/1961 | Tapper | 214/75 R |
| 3,519,154 | 7/1970 | Riley | 214/450 |

*Primary Examiner*—Robert J. Spar
*Assistant Examiner*—Lawrence J. Oresky
*Attorney, Agent, or Firm*—Christel & Bean

[57] ABSTRACT

A lifting apparatus is mounted directly on a vehicle for elevating relatively heavy loads from a lower level onto the roof of the vehicle. The lifting apparatus includes a hoist mounted on the upper end of a reciprocable support tube telescopically mounted in a receiving tube rigidly secured to the vehicle. The support tube is axially adjustable to vary the effective length thereof above the roof of the vehicle and is rotatable relative to its mounting to swing a lifted load onto the roof of the vehicle for storage during transport.

9 Claims, 8 Drawing Figures

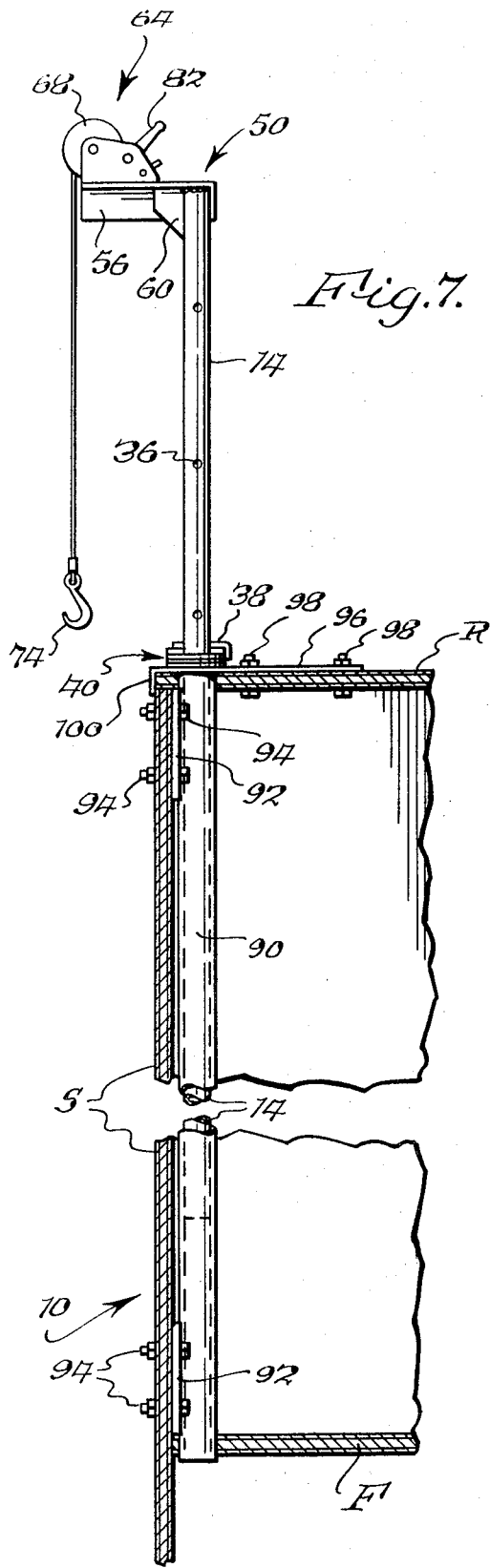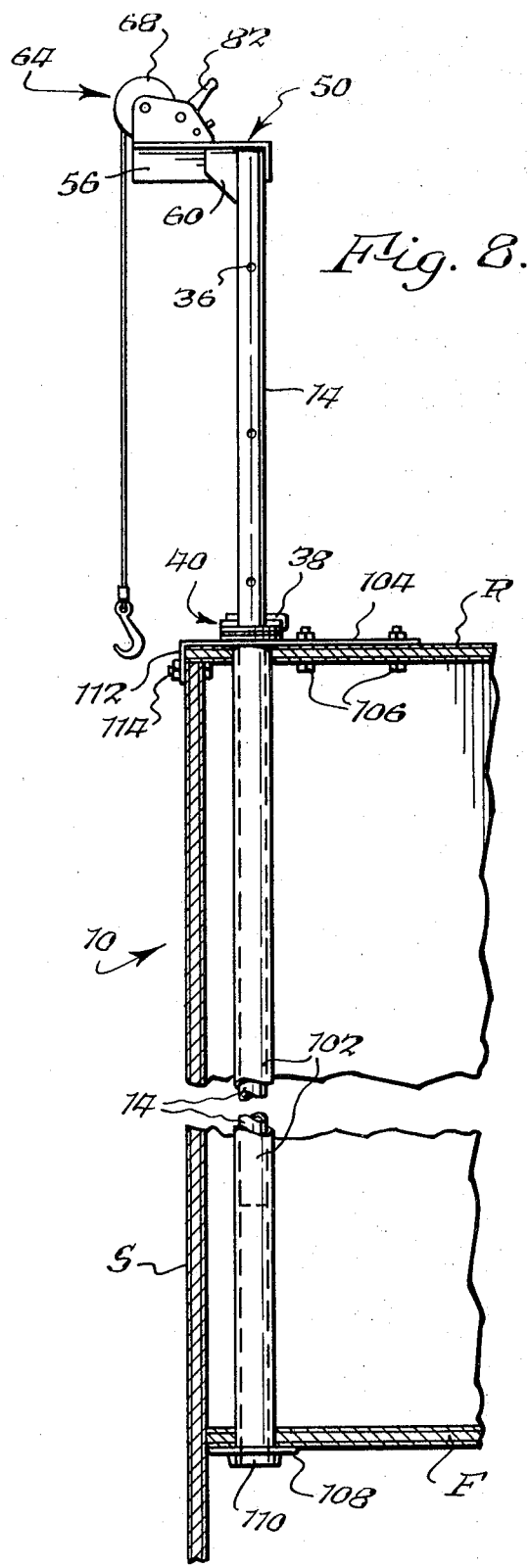

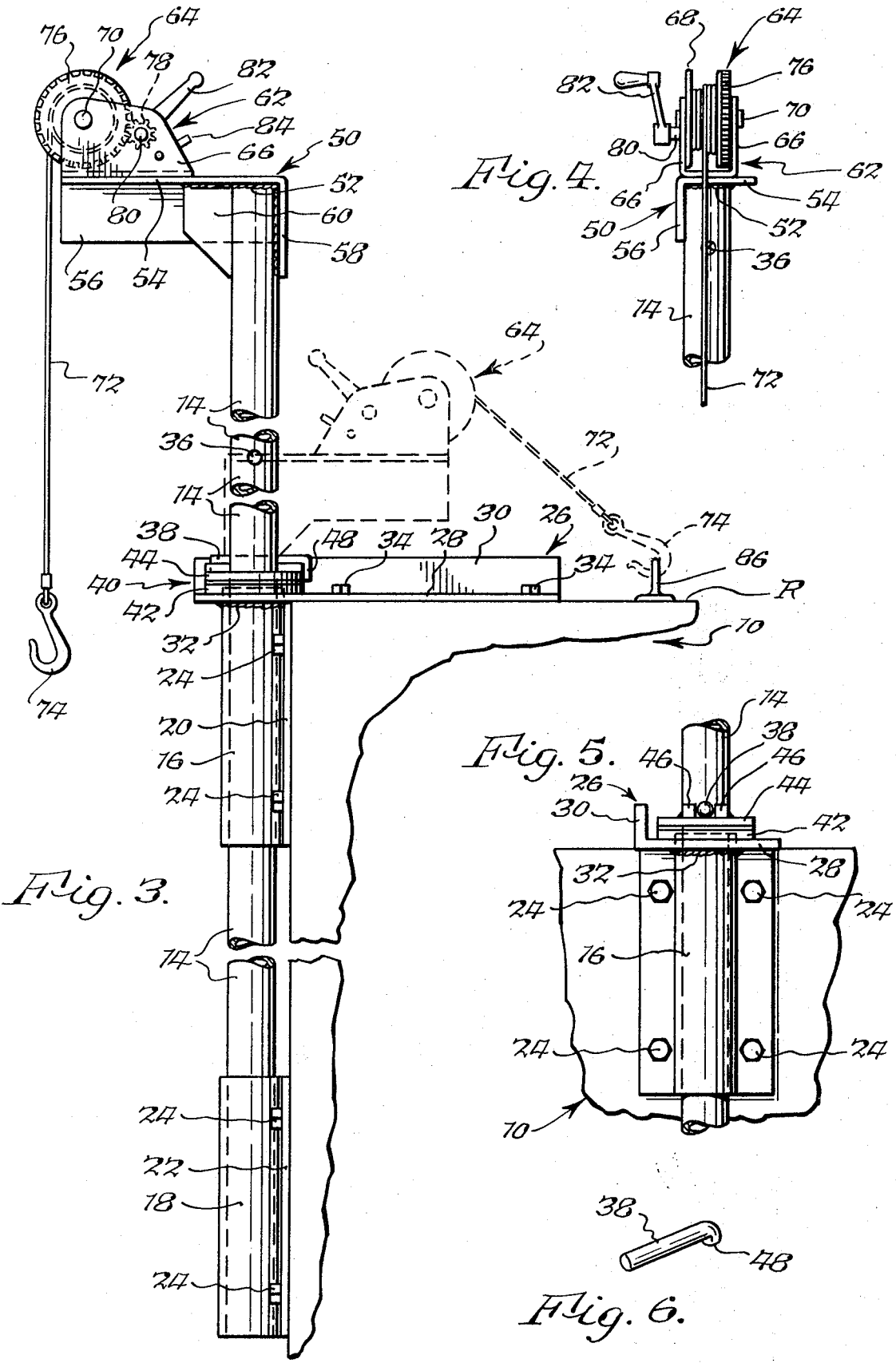

LIFTING APPARATUS

BACKGROUND OF THE INVENTION

This invention relates to a load lifting apparatus and, more particularly, to a lifting apparatus mounted on a recreational vehicle for elevating loads onto the upper deck thereof.

The upper deck or roof of a recreational vehicle, such as a mobile camper for example, provides a large area for the storage of equipment and/or recreational accessories. While luggage and other relatively light loads can be conveniently lifted onto the vehicle roof for storage during transport, the storage thereon of cumbersome and heavy equipment and loads, such as a heavy marine outboard motor, a mini-motorcycle, a large bulky trunk etc., presents a problem in elevating such loads to the level of the roof, thus discouraging the utility of this vast space for the portage of bulky and heavy loads.

SUMMARY OF THE INVENTION

The apparatus of the present invention, as hereinafter described, solves the above noted problems by providing a load lifting apparatus mounted directly on a vehicle, and which is simple and strong in construction, rugged and durable in use, and relatively low in cost.

Generally speaking, the lifting apparatus of this invention comprises a load elevating hoist mounted on the upper end of a reciprocable support tube telescopically mounted in one or more receiving tubes rigidly secured to the vehicle. The support tube is axially adjustable to vary the effective length thereof above the roof of the vehicle and is rotatable relative to its mounting to swing a lifted load for placement onto such vehicle roof for storage during transport. The support tube can be mounted exteriorly or interiorly of the vehicle body, as described.

BRIEF DESCRIPTION OF THE DRAWINGS

FIG. 3 is a front elevational view, on an enlarged scale, of the lifting apparatus of FIG. 1, showing the lowered retracted position of the hoist thereof in phantom;

FIG. 4 is a fragmentary side elevational view of the upper portion of the lifting apparatus;

FIG. 5 is a fragmentary side elevational view of an intermediate portion of the lifting apparatus;

FIG. 6 is a perspective view of a pin used in conjunction with this invention;

FIG. 7 is a front elevational view, partly in section, of another form of lifting apparatus of this invention; and FIG. 8 is a front elevational view, partly in section, of still another form of lifting apparatus of the present invention.

DETAILED DESCRIPTION OF AN ILLUSTRATIVE EMBODIMENT

Figure 1:
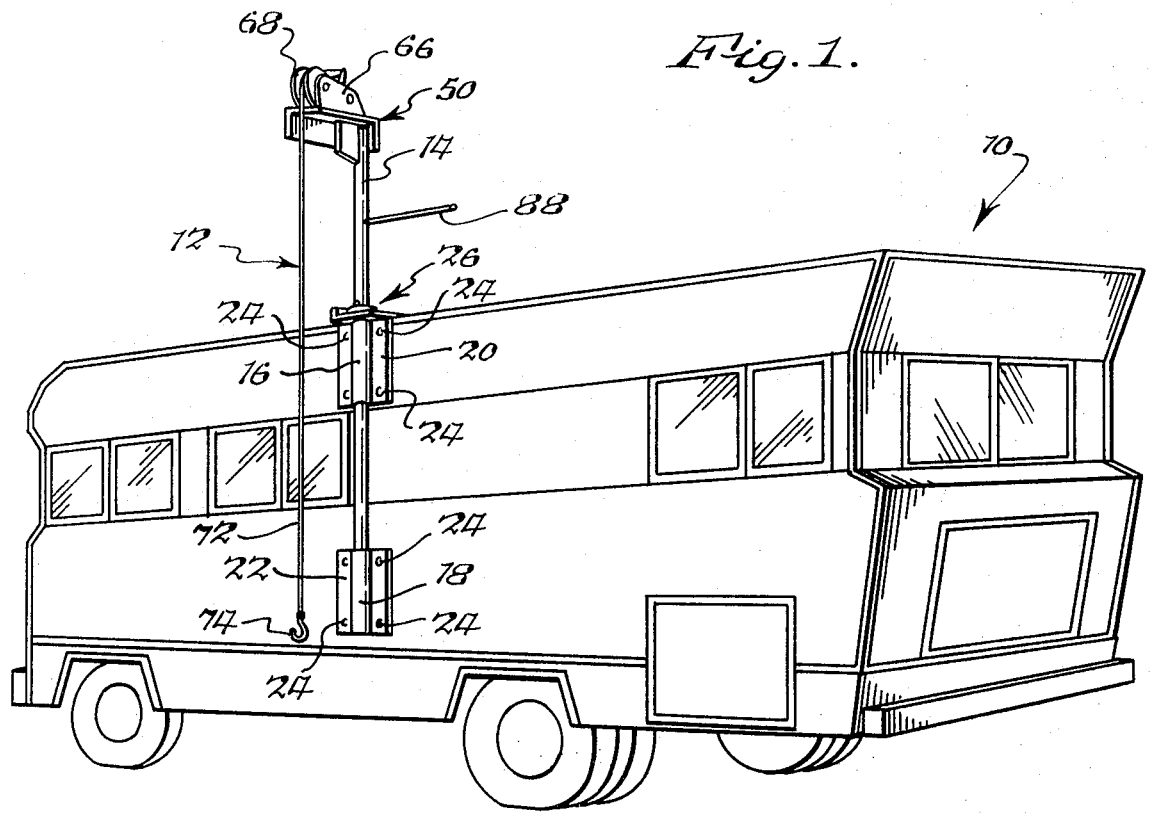
FIG. 1 is a perspective view of a recreational vehicle showing one form of a lifting apparatus of the present invention mounted thereon.
Figure 2:
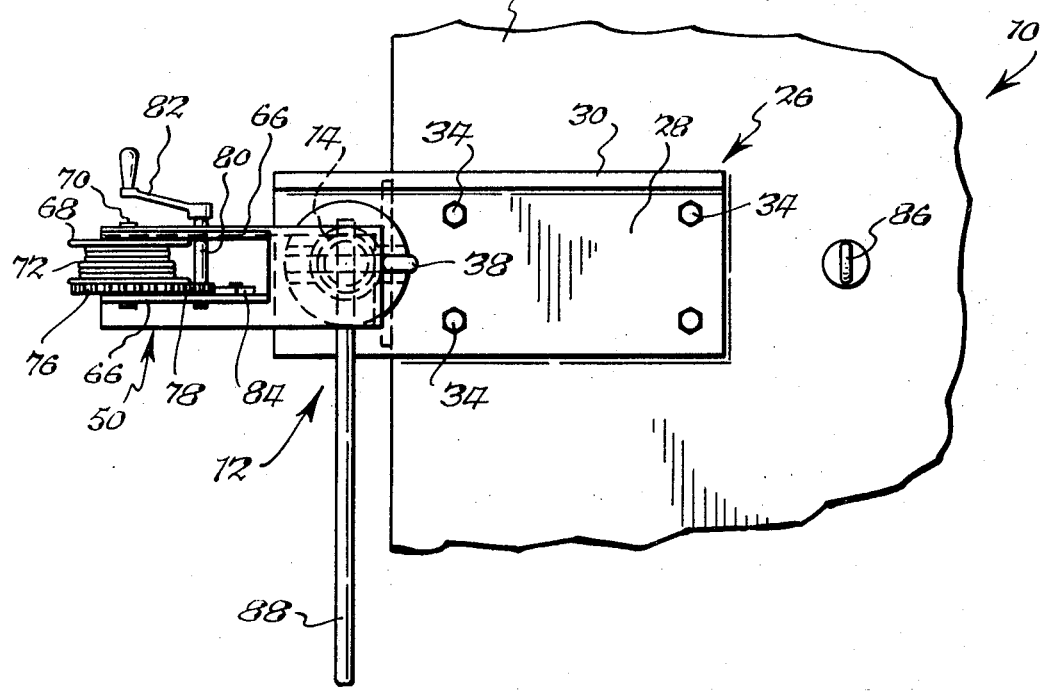
FIG. 2 is a fragmentary top plan view, on an enlarged scale, of the lifting apparatus of FIG. 1.

Referring now to the illustrative embodiment depicted in the accompanying drawings, there is shown in FIG. 1 a recreational vehicle 10 of the camper type having mounted thereon a lifting apparatus, generally designated 12, constructed in accordance with the present invention. While the present invention conveniently and preferably is used with a recreational vehicle of the type illustrated in FIG. 1, it should be understood that the lifting apparatus of this invention is in no manner restricted in use with such a specific vehicle, but has utility in any environment utilizing elevated storage areas and may be associated with any mobile or stationary apparatus.

Lifting apparatus 12 includes an elongated support tube 14 telescopically received in axially spaced receiving tubes 16 and 18 formed integral with mounting plates 20 and 22 secured to the side of vehicle 10 by suitable fasteners, such as bolts 24 for example. Of course, tubes 16 and 18, together with their associated plates 20 and 22, can be continuous to form a single receiving tube and plate, if desired, such tube being divided into spaced sections in the illustrated embodiment to minimize obstructions in the window area.

A supporting bracket 26, in the form of an L-shaped angle member having a horizontally extending base 28 and a vertically extending flange 30, is mounted adjacent the upper end of the upper receiving tube 16. Tube 16 extends slightly above plate 20 and projects upwardly through a circular opening formed in base 28. Tube 16 is rigidly secured to bracket 26 as by means of a weldment 32. The major portion of bracket 26 overlies the roof R of vehicle 10 and is rigidly secured by suitable fasteners, such as bolts 34.

Support tube 14 is axially adjustable within receiving tubes 16 and 18. To this end, a plurality of axially spaced, diametrically opposed openings 36 are provided in the cylindrical wall of support tube 14 for receiving a pin 38 therethrough to secure support tube 14 in the desired adjusted position. Preferably, each aligned pair of openings 36 are radially offset from the next axially adjacent pair of openings 36 to avoid a possible axial line of weakness between adjacent pairs of openings. The number of paired openings 36 provided in tube 14 and the spacing therebetween can vary, as desired, within the purview of this invention.

Support tube 14 also is mounted within receiving tubes 16 and 18 for rotation relative thereto. To facilitate such rotation, a bearing, generally designated 40, is mounted on bracket base 28 and comprises a stationary race 42 fitted onto the upper end of receiving tube 16 for retaining bearing rollers therein as is well known, and a bearing washer 44 rotatable on the bearing rollers.

Spaced retaining lugs 46 (FIGS. 3 and 5) are welded or otherwise fixedly secured to the outer face of washer 44 for defining diametrically opposed channels to receive the laterally projecting, exposed portions of pin 38 in the assembled relation. Pin 38 is provided with a right angularly bent end portion 48 adapted to overlie and engage the outer peripheral surface of washer 44. The channels defined by retaining lugs 46 are aligned with the selected openings 36 in order to insert pin 38 therethrough. The exposed portions of pin 38 projecting radially outwardly from support tube 14 and disposed in the opposed channels defined by lugs 46 bear against the upper surface of washer 44 and serve as a stop preventing inward or retracted movement of tube 14 within receiving tubes 16 and 18. Pin 38 constitutes suspension means for mounting support tube 14 in its operative, vertical position.

A platform 50 is welded, as at 52, to the upper end of support tube 14 as an integral part thereof. Platform 50 includes a flat, horizontaly extending base 54, an integral side wall 56 depending therefrom and an integral, depending rear end wall 58 welded to support tube 14 along the area of contact therewith. A gusset plate 60 is welded between tube 14 and platform base 54 to provide added support and reinforcement for the cantilevered portion of platform 50.

A generally U-shaped bracket 62 is welded or otherwise fixedly secured at its base to platform 50 for supporting a manually operable hoist, generally designated 64, between the upstanding legs 66 of bracket 62. Hoist 62 comprises a drum 68 having a rotatable shaft 70 suitably journalled adjacent its opposite ends in legs 66. A cable 72 is wound about drum 68 with one end (not shown) thereof suitably anchored on drum 68 and the other end being provided with a hook 74 for engagement with the load to be lifted.

The means for rotating drum 68 include a gear 76 mounted on shaft 70 in meshing engagement with a drive gear 78 mounted on a rotatable drive shaft 80 suitably journalled adjacent its opposite ends in bracket legs 66. One end of drive shaft 80 is provided with a manually operable crank 82 for rotating shaft 80 and thereby drum 68 to effect winding or unwinding of cable 72 and consequent raising or lowering of hook 74. A suitable manually operable ratchet pawl 84, movable into opposite operative positions is engageable with the teeth of drive gear 78 to permit rotation thereof in one direction but prevent rotation of drum 68 in the opposite direction or vice versa, as is well known in the art. While a hand operable crank type hoist is illustrated in the preferred embodiment, it should be appreciated that the present invention contemplates the use of an electrically operated hoist in lieu of the manually operated hoist, if desired.

When not in use, support tube 14 can be fully retracted within the receiving tubes 16 and 18 and rotated to position platform 50 and hoist 64 above the roof of vehicle 10 as shown in phantom in FIG. 3. Hook 74 of cable 72 can then be secured within the opening of an eye bolt 86 rigidly anchored in the roof R of vehicle 10. Thus, the hoist is conveniently retracted out of the way and tied down to the vehicle roof R by means of hook 74.

In use, hook 74 of cable 72 is disengaged from eye bolt 86 and support tube 14 is extended to raise hoist 64 to the desired or required elevation. The channels defined by retaining lugs 46 are then aligned with the appropriate pair of diametrically spaced openings 36 and pin 38 is inserted therethrough for locking tube 14 in the adjusted elevated position and locking tube 14 to bearing washer 44. Tube 14 is rotated in the proper direction to orient platform 50 and hoist 64 outwardly away from vehicle 10. Cable 72 is unwound and lowered sufficiently to enable the hook 74 thereof to be engaged with the load to be lifted. Crank 82 is then rotated to lift the load until it reaches a level slightly above the vehicle roof R. Tube 14 is rotated to swing the load directly above the vehicle roof R whereon the load is deposited. To facilitate rotation of support tube 14 when carrying a heavy load, an elongated rod 88 (FIG. 1) can be inserted in any pair of aligned openings 36 above those receiving pin 38 to serve as a handle in obtaining additional leverage.

FIG. 7 illustrates another form of mounting arrangement for support tube 14 which is similar to that described in the form illustrated in FIGS. 1–6 and operative in the same manner, except that the receiving tube is mounted interiorly of the vehicle body so as to preserve the integrity of the vehicle side walls and not detract from the exterior appearance thereof. To this end, a single, elongated receiving tube 90 is formed integral with a pair of axially spaced mounting plates 92 secured to the inner wall surface of vehicle 10 by suitable fasteners, such as bolts 94. Of course, a single elongated plate can be substituted for the two spaced plates 92, if desired. The upper and lower ends of tube 90 extend beyond the plates 92 and project through suitable openings formed in the roof and floor of vehicle 10.

The upper end of receiving tube 90 also projects through an opening formed in a roof mounting bracket 96 fastened to the upper surface of the vehicle roof by a plurality of bolts 98. One end of bracket 96 is provided with a depending flange 100 in abutting engagement with the outer surface of the vehicle side wall S. All the other components, including support tube 14, are identical to those previously described in connection with the first form of the invention and the same reference numerals are used to designate similar elements. An advantage residing in the latter form of the invention is that the receiving tube 90 and associated plates 92, together with the major portion of support tube 14, are concealed within the body of vehicle 10 so as not to detract from the attractive exterior appearance of the vehicle.

Still another form of the present invention is illustrated in FIG. 8 and comprises an elongated receiving tube 102 secured adjacent its opposite ends to a bracket 104 secured to the vehicle roof by suitable bolts 106 and a plate 108 welded or otherwise fixedly secured to the underside of the vehicle floor F. Aligned openings are formed in the bracket 104, vehicle roof R, plate 108 and vehicle floor F to receive tube 102. The bottom of tube 102 is welded to an annular enlargement 10 provided on the underside of plate 108. Bracket 104 is provided with a depending flange 112 in abutting engagement with the outer surface of the vehicle side wall S and secured thereto by suitable bolts 114. All the other components, including the support tube 14, are identical to those previously described in connection with the first form of the invention and the same reference numerals designate similar parts. This form of the invention has the same advantage as that of the form illustrated in FIG. 7, i.e. the receiving tube and the major portion of the support tube 14 are concealed within the body of vehicle 10 so as not to interrupt the integrity of the exterior wall surface nor detract from the appearance thereof.

The present invention thus provides a relatively simple and novel lifting apparatus mounted as an attachment to a vehicle, especially of the recreational type, for lifting heavy and awkward loads from a ground or low level onto the roof of the vehicle for utilizing the storage space offered thereby. The lifting apparatus is axially adjustable to accommodate loads of various sizes and is readily rotated to move loads in various angular directions. When not in use, the lifting apparatus is collapsed into a retracted position in close proximity to the vehicle roof.

Preferred embodiments of this invention having been described in detail, it is to be understood that this has been done by way of illustration only.

I claim:

1. A lifting apparatus in combination with a vehicle body comprising: a mobile body; support means rigidly secured to said mobile body; an elongated, vertically extending tube telescopically received within said support means for reciprocable movement relative thereto; means including a bearing for mounting said tube for rotational movement relative to said support means; a washer keyed to said tube for rotation therewith relative to said support means; said reciprocable tube having a plurality of paired, diametrically opposed openings spaced axially along said tube; a pin insertable into a selected pair of said diametrically opposed openings and having portions engagable with and supported by said washer for securing said tube in any of a plurality of axially adjusted positions corresponding to any one of said plurality of paired diametrically opposed openings, said washer having means to lock said washer to said pin in a horizontal plane for rotation therewith when said pin is inserted into said opposed openings and whereby said washer is freely rotatable with respect to said vertically extending tube when said pin is removed from said opposed openings; a hoist mounted on the upper end of said tube for axial and rotational movement therewith; said hoist comprising a cable wound about a drum and having means on the distal end thereof for engaging a load; and drive means for imparting motion to said cable for raising and lowering said load engaging end, whereby said bearing supports the combined weight of said vertically extending tube, said load and said hoist.

2. The combination of claim 1 including spaced lugs fixedly secured to said washer and defining diametrically opposed channels adapted to be aligned with said selected pair of openings for receiving said pin portions in the assembled relation.

3. The combination of claim 1 including a platform rigidly secured to the upper end of said tube, a bracket secured to said platform, said hoist being mounted on said bracket.

4. The combination of claim 3 wherein said drive means includes a rotatable shaft supporting said hoist drum and journalled in said bracket; a first gear secured to said shaft; a second gear in meshing engagement with said first gear and rigidly secured to one end of a drive shaft journalled in said bracket; and means connected to th other end of said drive shaft for rotating said drive shaft.

5. The combination of claim 4 wherein said body has a roof and a floor provided with aligned openings, respectively; said support means comprising a bracket mounted on the outer surface of said roof opening for receiving the upper end of said tubular member, and a plate secured to the outer surface of said floor and having an opening in registry with said floor opening for receiving the lower end of said tubular member; said bearing being secured to said bracket about said tubular member.

6. The combination of claim 1 wherein said support means comprises at least one tubular member for receiving said tube; and a mounting plate formed integral with said tubular member for attachment to said mobile body.

7. The combination of claim 6 wherein said body has an exposed outer wall surface and a roof; said plate being rigidly secured to said outer wall surface; said support means further comprising a bracket mounted on said roof and having a portion projecting outwardly beyond said outer wall surface; said projecting portion having an opening for receiving said tubular member; said bearing being secured to said bracket about said tubular member.

8. The combination of claim 6 wherein said body has a side wall, a roof and a floor; said plate being rigidly secured to the inner surface of said side wall; said roof and said floor having aligned openings for accommodating said tubular member; said support means further comprising a bracket mounted on the outer surface of said roof and having an opening in registry with said roof opening for receiving the upper end of said tubular member; said bearing being secured to said bracket about said tubular member.

9. The combination of claim 1 including spaced lugs fixedly secured to said washer and defining diametrically opposed channels adapted to be aligned with said selected pair of openings for receiving said pin portions in the assembled relation; said support means comprising at least one tubular member for receiving said tube; a mounting plate connected to said tubular member and attached to said mobile body; a platform rigidly secured to the upper end of said tube; a bracket secured to said platform; said hoist being mounted on said bracket; said drive means including a rotatable shaft supporting said hoist drum and journalled in said bracket; a first gear secured to said shaft; a second gear in meshing engagement with said first gear and rigidly secured to one end of a drive shaft journalled in said bracket; and means connected to the other end of said drive shaft for rotating said drive shaft.

* * * * *